United States Patent
Foster et al.

(10) Patent No.: US 12,060,097 B2
(45) Date of Patent: Aug. 13, 2024

(54) DELIVERY DOLLIES INCLUDING BIASED LOCKING ASSEMBLIES FOR LOCKING CAROUSELS

(71) Applicant: Toyota Motor Engineering & Manufacturing North America, Inc., Plano, TX (US)

(72) Inventors: Scottie L. Foster, Lawrenceburg, KY (US); Bradley J. Garcia, Louisville, KY (US); Lloyd R. Holland, Georgetown, KY (US); Michael C. Greenlee, Paris, KY (US); Annetta L. Allen, Lexington, KY (US); Johnny O. Boarman, IV, Frankfort, KY (US); Jeffrey L. James, Mount Sterling, KY (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 315 days.

(21) Appl. No.: 17/733,535

(22) Filed: Apr. 29, 2022

(65) Prior Publication Data
US 2023/0347955 A1    Nov. 2, 2023

(51) Int. Cl.
*B62B 3/02* (2006.01)
*B62B 5/00* (2006.01)

(52) U.S. Cl.
CPC . *B62B 3/02* (2013.01); *B62B 5/00* (2013.01)

(58) Field of Classification Search
CPC ....................................................... B62B 3/02
See application file for complete search history.

(56) References Cited

U.S. PATENT DOCUMENTS

| | | | | |
|---|---|---|---|---|
| 4,108,518 A | * | 8/1978 | Angst | A47J 39/02 |
| | | | | 312/305 |
| 6,220,184 B1 | | 4/2001 | Sack | |
| 9,511,786 B1 | * | 12/2016 | Hickcox | B62B 5/0083 |
| 2011/0266774 A1 | * | 11/2011 | Gregg | B62D 13/04 |
| | | | | 384/618 |
| 2012/0274196 A1 | * | 11/2012 | Arceta | B62B 3/1476 |
| | | | | 312/249.11 |
| 2014/0218282 A1 | * | 8/2014 | Hung | B62B 3/02 |
| | | | | 280/638 |

(Continued)

FOREIGN PATENT DOCUMENTS

| | | |
|---|---|---|
| CN | 208344275 U | 1/2019 |
| CN | 209734407 U | 12/2019 |

(Continued)

*Primary Examiner* — Erez Gurari
(74) *Attorney, Agent, or Firm* — Dinsmore & Shohl LLP

(57) ABSTRACT

A delivery dolly includes a carousel that is rotatably mounted on a support column. The carousel includes a recess on an underside of the carousel. A locking mechanism is biased toward a locked position. The locking mechanism includes a locking wheel on which the carousel rotates until the carousel reaches a preselected angular position. The recess aligns with the locking wheel at the preselected angular position and, due to a bias force, the locking wheel extends into the recess to inhibit rotation of the carousel until the carousel is spun manually, forcing the carousel to rotate and the locking wheel to retract until the locking wheel encounters the recess again.

12 Claims, 3 Drawing Sheets

(56) References Cited

U.S. PATENT DOCUMENTS

| | | | |
|---|---|---|---|
| 2015/0105660 A1* | 4/2015 | Ninomiya | A61B 8/4427 |
| | | | 600/437 |
| 2015/0166090 A1* | 6/2015 | Hardy | A61B 50/15 |
| | | | 280/47.35 |
| 2017/0029003 A1* | 2/2017 | Crowley | B62B 3/0612 |
| 2020/0290660 A1* | 9/2020 | Wright | A61B 50/13 |
| 2021/0070338 A1* | 3/2021 | Wright | A61B 50/13 |
| 2023/0347955 A1* | 11/2023 | Foster | B62B 5/00 |

FOREIGN PATENT DOCUMENTS

| | | |
|---|---|---|
| CN | 213354527 U | 6/2021 |
| EP | 2484610 A2 | 8/2012 |
| JP | 6899172 B1 | 7/2021 |

* cited by examiner

DELIVERY DOLLIES INCLUDING BIASED LOCKING ASSEMBLIES FOR LOCKING CAROUSELS

TECHNICAL FIELD

The present specification generally relates to delivery dollies and, more particularly to delivery dollies that include biased locking mechanisms for locking carousels.

BACKGROUND

Dollies come in a variety of shapes and sizes. One of the most common dolly configurations is a generally L-shaped dolly with vertically extending handles, a base platform and wheels at opposite sides of the base platform. Objects may be seated on the base platform and lifted off the ground by tilting the handles backward toward the operator, acting as a lever. The dolly may then be pulled or pushed around with the center of gravity of the objects over the wheels. In some embodiments, various dollies may have a moveable platform, such as a carousel, that can move relative to a frame of the dollies.

Accordingly, what is needed is a locking assembly for dollies with rotating carousels.

SUMMARY

In one embodiment, a delivery dolly includes a carousel that is rotatably mounted on a support column. The carousel includes a recess on an underside of the carousel. A locking mechanism is biased toward a locked position. The locking mechanism includes a locking wheel on which the carousel rotates until the carousel reaches a preselected angular position. The recess aligns with the locking wheel at the preselected angular position and, due to a bias force, the locking wheel extends into the recess to inhibit rotation of the carousel until the carousel is spun manually, forcing the carousel to rotate and the locking wheel to retract until the locking wheel encounters the recess again.

In another embodiment, a method of controlling rotation of a carousel of a delivery dolly is provided. The method includes rotatably mounting the carousel to a support column of the delivery dolly. The carousel includes a recess on an underside of the carousel. A locking mechanism is mounted to the support column. The locking mechanism is biased toward a locked position. The locking mechanism includes a locking wheel on which the carousel rotates until the carousel reaches a preselected angular position. The recess aligns with the locking wheel at the preselected angular position and, due to a bias force. The locking wheel extending into the recess thereby inhibiting rotation of the carousel until the carousel is spun manually, forcing the carousel to rotate and the locking wheel to retract until the locking wheel encounters the recess again.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to delivery dollies that includes a biased locking mechanism that is biased toward a locked position. The locking mechanism includes wheels on which a carousel rotates until the carousel reaches a preselected angular position. Recesses in a bottom of the carousel are provided that align with the wheels and due to the bias, the wheels snap into openings in the bottom of the carousel and inhibit rotation until the carousel is spun manually, forcing the carousel to rotate and the wheels to retract until they encounter the recesses again and snap back into place in the recesses.

Figure 1:
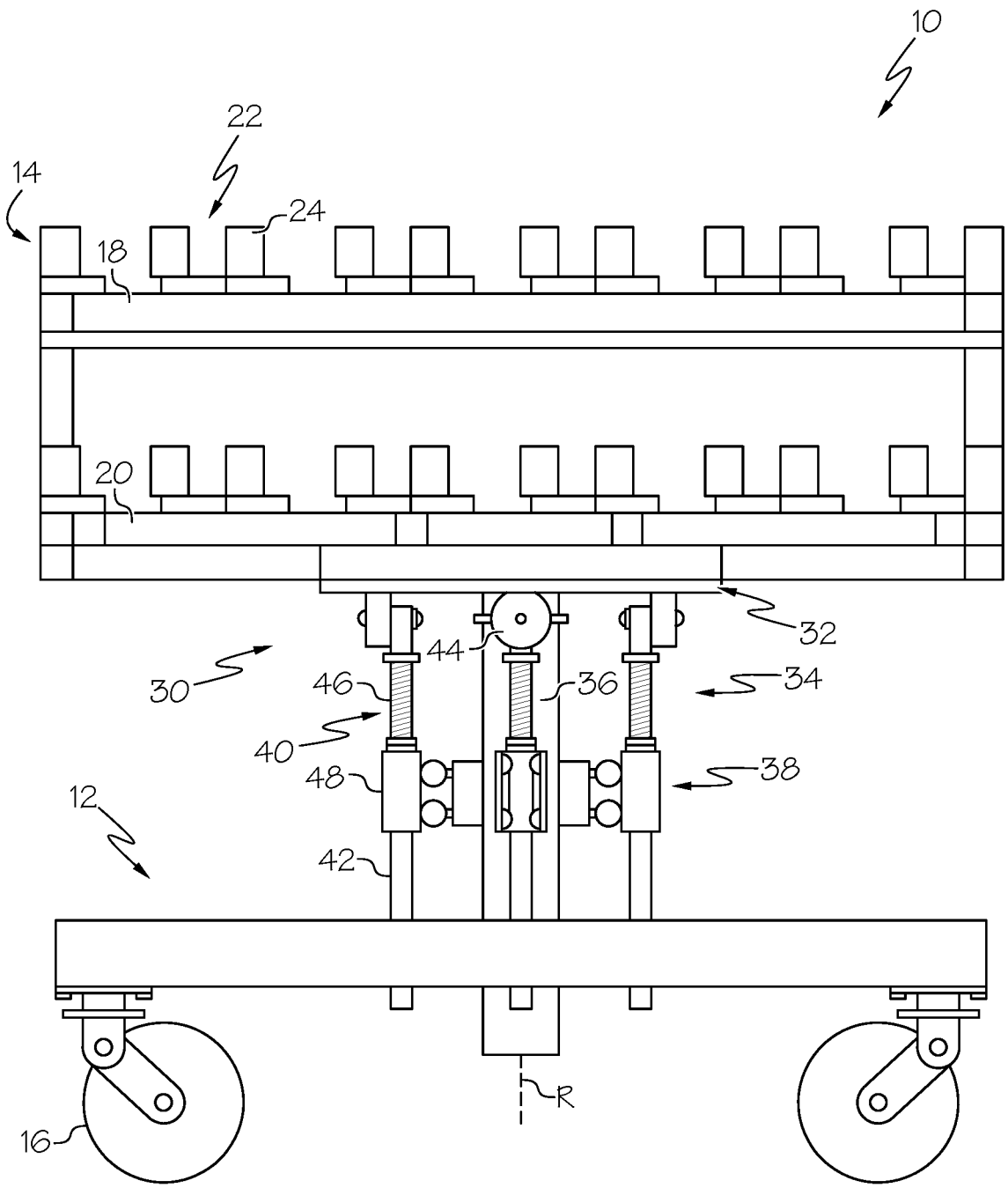
FIG. 1 is a side view of a dolly assembly including a locking assembly for locking a carousel, according to one or more embodiments shown and described herein.
Figure 2:
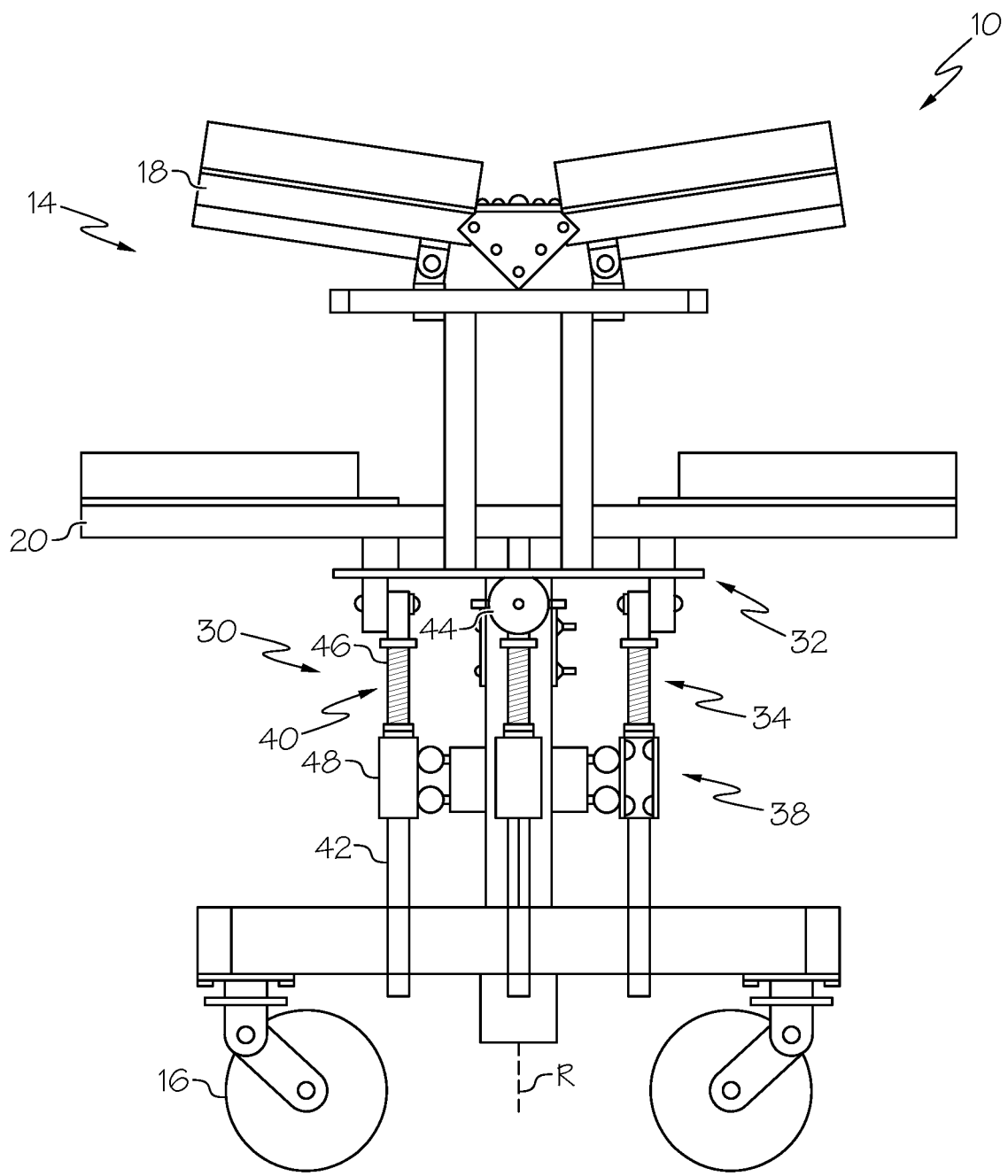
FIG. 2 is an end view of the dolly assembly of FIG. 1, according to one or more embodiments shown and described herein.

Referring to FIGS. 1 and 2, a delivery dolly 10 used to transport parts in an assembly environment, such as an automotive assembly environment, is illustrated. The delivery dolly 10 includes a base 12 and a tray assembly 14 that is carried by the base 12. The base 12 includes one or more casters or wheels 16 that facilitate movement of the delivery dolly 10 from a load location to an assembly location. The tray assembly 14 includes one or more trays 18 and 20 on which part slots 22 are provided. The part slots 22 may be formed by, for example, pieces 24 of foam that hold parts and inhibit the parts from colliding. The parts may be vehicle radios or head units, for example.

A carousel assembly 30 is provided between the base 12 and the tray assembly 14. The carousel assembly 30 includes a rotating carousel 32 and a locking mechanism 34. The carousel 32 is rotatably supported on a support column 36 spaced from the base 12 that provides an axis of rotation R for the carousel 32. The locking mechanism 34 includes a mount assembly 38 that is mounted to the support column 36 and locking wheel assemblies 40 that are supported by the mount assembly 38 and the support column 36. In the illustrated embodiment, there are four locking wheel assemblies 40, each locking wheel assembly 40 being spaced from adjacent locking wheel assemblies 40 by 90 degrees.

The locking wheel assemblies 40 include a shaft 42 and a locking wheel 44 that is rotatably mounted to an end of a respective shaft 42. The shaft 42 can slide up-and-down relative to the mount assembly 38. A coil spring 46 is located between a shaft mount 48 and the locking wheel 44 that biases the shaft 42 and locking wheel 44 toward a locked position. The locking wheels 44 rotate with the carousel 32 and facilitate spinning of the carousel 32 to different angular position when spun manually by an operator.

Figure 3:
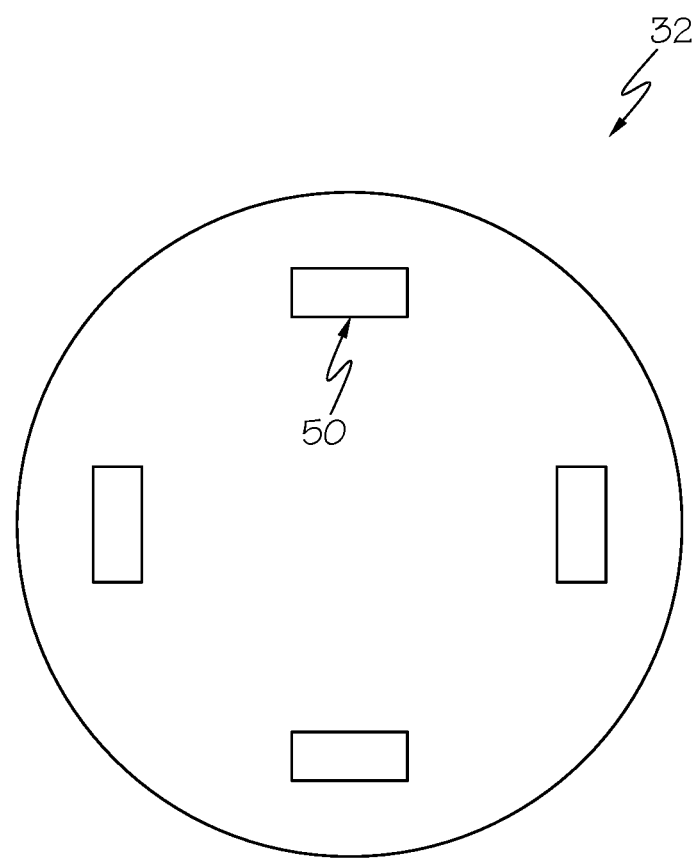
FIG. 3 shows an underside of a carousel for use with the dolly assembly of FIG. 1

Referring to FIG. 3, the carousel 32 is illustrated in isolation. The carousel 32 is a rotating table that can be any suitable shape. In the illustrated example, the carousel is circular, but could be any suitable non-circular shape, such as square. Recesses 50 are provided in an underside 52 of the carousel 32 that are sized to receive the locking wheels 44 and inhibit rotation of the carousel 32. The bias force provided by the springs 46 provided a resistive force that resists rotation of the carousel 32 until a manual force is applied to the carousel 32 sufficient to overcome the bias force. The recesses 50 are spaced-apart from each other 90 degrees to correspond to the positions of the locking wheels 44.

Referring to FIGS. 1-3, in operation, the locking mechanism 34 is in the locked position with the locking wheels 44 received within the recesses 50. The springs 46 provide a bias against retraction of the locking wheels 44 from the recesses 50, which also provides a resistance to rotation of the carousel 32, as mentioned above. When it is desired to rotate or spin the carousel 32 to a different angular position, the user manually applies a rotational force to the tray assembly 14. If the rotation force is sufficient to overcome the spring bias, the locking wheels 44 will retract out of the recesses 50 as the carousel 32 rotates. Once the locking wheels 44 are out of the recesses 50 the carousel 32 can freely rotate 90 degrees until the locking wheels 44 again encounter the recesses 50. Due to the spring bias, when the locking wheels 44 encounter the recesses 50, the locking wheels 44 roll back into the recesses 50 to the locked position again providing a resistance against rotation of the carousel 32.

The above-described dolly assemblies include locking mechanisms that inhibit rotation of a carousel in a locked position. The locking mechanisms are spring-biased toward the locked position. Application of a sufficient manual rotation force can overcome the bias force of the springs thereby allowing rotation of the carousel until locking wheels again encounter corresponding recesses on an underside of the carousel. The locking wheels and the recesses are spaced-apart 90 degrees allowing for 90 degrees of free rotation by the carousel until the locking mechanism springs back to the locked position thereby inhibiting rotation of the carousel. Such a biased locking arrangement inhibits over-rotation of the carousel beyond 90 degrees.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A delivery dolly comprising:
   a carousel that is rotatably mounted on a support column, the carousel including a recess on an underside of the carousel; and
   a locking mechanism that is biased toward a locked position, the locking mechanism comprising a locking wheel on which the carousel rotates until the carousel reaches a preselected angular position;
   wherein the recess aligns with the locking wheel at the preselected angular position and, due to a bias force, the locking wheel extends into the recess to inhibit rotation of the carousel until the carousel is spun manually, forcing the carousel to rotate and the locking wheel to retract until the locking wheel encounters the recess again.

2. The delivery dolly of claim 1, wherein the locking wheel is part of a locking wheel assembly comprising a shaft, the locking wheel rotatably mounted to the shaft.

3. The delivery dolly of claim 2, wherein the locking mechanism comprises a mount assembly comprising a shaft mount that slidably receives the shaft.

4. The delivery dolly of claim 3, wherein a spring is located between the shaft mount and the locking wheel, the spring providing a bias force that biases the locking mechanism toward the locked position.

5. The delivery dolly of claim 2, wherein the locking wheel assembly is a first locking wheel assembly, the locking mechanism comprising multiple locking wheel assemblies that are each received within recesses on the underside of the carousel.

6. The delivery dolly of claim 5, therein the multiple locking wheel assemblies are spaced-apart 90 degrees from each other.

7. A method of controlling rotation of a carousel of a delivery dolly, the method comprising:
   rotatably mounting the carousel to a support column of the delivery dolly, the carousel including a recess on an underside of the carousel;
   mounting a locking mechanism to the support column, the locking mechanism being biased toward a locked position, the locking mechanism comprising a locking wheel on which the carousel rotates until the carousel reaches a preselected angular position;
   wherein the recess aligns with the locking wheel at the preselected angular position and, due to a bias force, the locking wheel extending into the recess thereby inhibiting rotation of the carousel until the carousel is spun manually, forcing the carousel to rotate and the locking wheel to retract until the locking wheel encounters the recess again.

8. The method of claim 7, wherein the locking wheel is part of a locking wheel assembly comprising a shaft, the locking wheel rotatably mounted to the shaft.

9. The method of claim 8, wherein the locking mechanism comprises a mount assembly comprising a shaft mount that slidably receives the shaft.

10. The method of claim 9, wherein a spring is located between the shaft mount and the locking wheel, the spring providing a bias force that biases the locking mechanism toward the locked position.

11. The method of claim 8, wherein the locking wheel assembly is a first locking wheel assembly, the locking mechanism comprising multiple locking wheel assemblies that are each received within recesses on the underside of the carousel.

12. The method of claim 11, wherein the multiple locking wheel assemblies are spaced-apart 90 degrees from each other.

* * * * *